May 19, 1970 G. J. VIOLLET 3,512,261

MACHINIST'S LOCATING TOOL

Filed Aug. 5, 1968

INVENTOR.

Gerard Viollet

United States Patent Office 3,512,261
Patented May 19, 1970

3,512,261
MACHINIST'S LOCATING TOOL
Gerard J. Viollet, 1619½ W. 134th St.,
Gardena, Calif. 90249
Filed Aug. 5, 1968, Ser. No. 750,369
Int. Cl. G01b 5/25
U.S. Cl. 33—169                                2 Claims

ABSTRACT OF THE DISCLOSURE

A machinist's locating tool having a magnetic cylindrical shank having an end pierced to receive and hold magnetically a disc flange having different locating tips mounted therein.

---

This invention relates to revolving locating tools for use on machine tools such as milling machine, jig bore, drill press, etc. Said tools are commonly named wiggler, edge finder, center finder; such revolving tools are well described in Pats. Nos. 1,109,625; 1,289,640; 1,300,428; 1,398,881; 1,805,285; and 1,252,777; 1,414,750; 1,984,864; 2,451,904; 2,674,807.

Important objects of the invention is to provide:

(a) A combination sticky pin, ferrous metal pick up, and conventional locating tool.

(b) A simple device with no spring, no thread, no assembly.

(c) A device with magnetic pull force for locating tips.

(d) Locating tips ends which are either magnetic or not.

(e) A device which can be quickly stuck on any suitable surface.

(f) A device which picks up ferrous metals from inaccessible places such as cavities, eyes, etc.

(g) A machinist's locating tool which can be either held in a spindle of machine tools or stick on suitable surfaces.

Other and further objects and advantages of the invention will be apparent from the following description thereof and from the claims appended thereto.

In the drawings wherein like numerals refer to like or corresponding parts throughout the several views.

Figure 1:
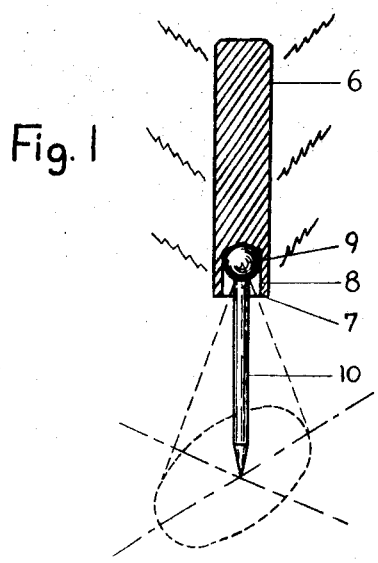
FIG. 1 is a longitudinal sectional view of the locating tool.
Figure 2:
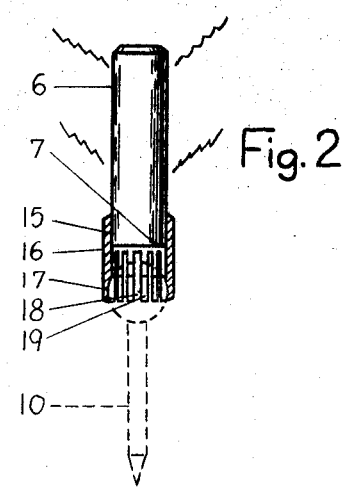
FIG. 2 is a longitudinal view of the locating tool and sectional view of the attached prongs.
Figure 3:
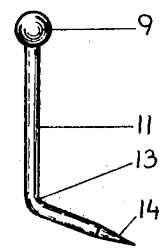
FIG. 3 is a longitudinal view of a bent pin.
Figure 4:
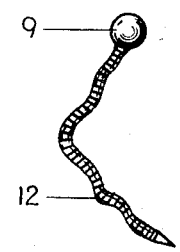
FIG. 4 is a longitudinal view of a flexible pin.
Figure 5:
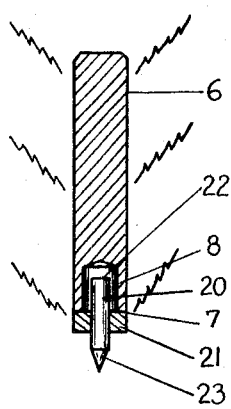
FIG. 5 is a longitudinal sectional view of the locating tool.
Figure 6:
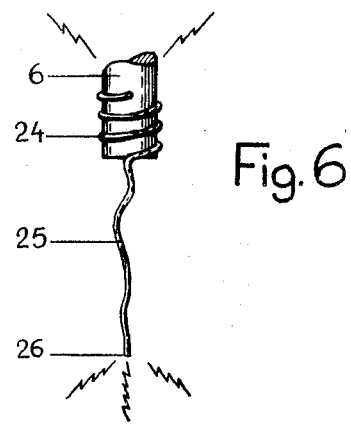
FIG. 6 is a partial longitudinal view of the magnetic shank and a magnet extension.

Referring to the drawings, the numeral 6 designates generally the cylindrical shank magnet with an end 7 having a central bore 8 which receives a ball 9 made of ferrous or magnetic material, said ball is mounted on a centering pin 10 or a lining pin 11 or a flexible pin 12; said pin 11 is bent at 13 and ends with a conical point 14; said lining flexible pin 12 can take any shape and stay and is also ended with a conical point; said cylindrical magnet 6 can also have an end 7 fitting permanently a bore 15 of a tube 16 which is ended with a spherical groove 17 and said tube 16 has longitudinal slots 18 enabling prongs 19 to spring easily to let enter ball 9 and retain frictionally said ball 9 in spherical groove 17; said magnet 6 has its longitudinal axis perpendicular to end 7, and said bore 8 is adapted to receive also a smaller cylindrical pin 20 preferably non ferrous and press fit into a flange 21 made of magnetic or ferrous material, said pin 20 has one of its ends 22 square and its other end 23 with a conical point; said pin 20 permanently mounted in flange 21 is reversible and can be used at both sides; said cylindrical magnet 6 can be instantly fastened anywhere on any suitable surface of the machine tool to align work or to check reference marks with the conical point, said magnet can also be held in spindle of machine tools as conventional locating tools; said ball 9 and flange 21 are fastened to magnet 6 with magnetic force. Said magnet 6 has on one of its ends a preferably helicoidal wire form 24 which grips the magnet 6 and extends said magnet with a pin 25 flexible or not which has a preferably square end 26, or a conical point as 14; said magnet 6, and pins 10, 11, 12, 20, 25, when made of ferrous or magnetic material can be used for picking up ferrous materials from places or inaccessible places. Said magnet 6 is always handy for a machinist as it serves different purposes such as holding sketches or notes on machines, tool boxes, etc.

While the foregoing has illustrated and described what is now contemplated to be the best mode of carrying out the invention, the construction are, of course, subject to modification and improvement without departing from the spirit and scope of the invention. It is therefore, not desired to restrict the invention to the particular forms of construction illustrated and described, but to cover all modifications that may fall within the scope of the appended claims.

Having thus described the invention, what is claimed as new is:

1. A machinist's locating tool comprising in combination, and elongated cylindrical shank member formed from a permanent magnet and adapted to be held in the spindle of machine tools whereby work can be located, centered or aligned, said shank member having one of its ends perpendicular to its longitudinal axis, said end is provided with a central longitudinally extending bore, a magnetic disc flange magnetically attached to said end of the shank member, said disc flange having a nonmagnetic pin, perpendicularly and centrally attached to said flange and extending from opposite sides of said flange, said pin having a flat end on one end and a conical point at the other end, one of said ends of said pin extending into said bore when the flange is attached to the shank member when the tool is ready for use.

2. A tool according to claim 1 wherein the disc flange has the same diameter as the cylindrical shank.

References Cited

UNITED STATES PATENTS

| 2,390,339 | 12/1945 | Ullman et al. | 128—1.4 X |
| 2,831,260 | 4/1958 | Shaw. | |
| 1,297,729 | 3/1919 | Picard | 33—169 |
| 1,398,881 | 11/1921 | Moore | 33—169 |
| 1,521,173 | 12/1924 | Catching | 294—65.5 |
| 2,617,409 | 11/1952 | Biederman | 128—1.4 |
| 2,976,613 | 3/1961 | Shields. | |
| 3,028,675 | 4/1962 | Mahlmeister et al. | |

FOREIGN PATENTS

| 560,523 | 4/1944 | Great Britain. |
| 644,902 | 10/1950 | Great Britain. |

HARRY N. HAROIAN, Primary Examiner